United States Patent
Baum et al.

(10) Patent No.: US 6,510,319 B2
(45) Date of Patent: Jan. 21, 2003

(54) METHOD FOR OPTIMIZING FORWARD LINK POWER LEVELS DURING SOFT HANDOFFS IN A WIRELESS TELECOMMUNICATIONS NETWORK

(75) Inventors: Modris Olgerts Allen Baum, Rockaway, NJ (US); Eshwar Pittampalli, Randolph, NJ (US); Carl Francis Weaver, Township of Hanover, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/019,267

(22) Filed: Feb. 5, 1998

(65) Prior Publication Data

US 2001/0011018 A1 Aug. 2, 2001

(51) Int. Cl.[7] .................................................. H04Q 7/20
(52) U.S. Cl. ........................................ 455/442; 455/522
(58) Field of Search ................................ 455/436, 439, 455/442, 69, 63, 453, 522; 330/331, 342, 441; 335/200

(56) References Cited

U.S. PATENT DOCUMENTS

| 5,345,448 A | | 9/1994 | Keskitalo |
| 5,454,026 A | | 9/1995 | Tanaka |
| 5,682,416 A | | 10/1997 | Schmidt et al. |
| 5,754,945 A | | 5/1998 | Lin et al. |
| 5,771,451 A | | 6/1998 | Takai et al. |
| 5,864,760 A | * | 1/1999 | Gilhousen et al. ........... 455/442 |
| 5,878,350 A | * | 3/1999 | Nakamura et al. ........... 455/442 |
| 5,884,177 A | | 3/1999 | Hanley |
| 5,884,187 A | * | 3/1999 | Ziv et al. ..................... 455/442 |
| 5,893,035 A | * | 4/1999 | Chen .......................... 455/442 |
| 5,913,167 A | | 6/1999 | Bonta et al. |
| 5,940,762 A | * | 8/1999 | Lee et al. .................... 455/442 |
| 5,949,773 A | * | 9/1999 | Bhalla et al. ............... 455/436 |

FOREIGN PATENT DOCUMENTS

| EP | 0822672 | 4/1998 |
| WO | 9734439 | 9/1997 |

* cited by examiner

*Primary Examiner*—William Trost
*Assistant Examiner*—Philip J. Sobutka
(74) *Attorney, Agent, or Firm*—Harness, Dickey & Pierce P.L.C.

(57) ABSTRACT

Performance of a wireless telecommunications systems is enhanced by communication of an actual applied forward link gain and, if necessary, an overload indicator from base stations participating in a soft handoff. Subsequently, a power control system within a selection/distribution unit determines a forward link gain acceptable to all base stations involved in a soft handoff call.

4 Claims, 3 Drawing Sheets

METHOD FOR OPTIMIZING FORWARD LINK POWER LEVELS DURING SOFT HANDOFFS IN A WIRELESS TELECOMMUNICATIONS NETWORK

CROSS REFERENCE TO RELATED APPLICATION

This application Ser. No. 09-019,266 is related to the application of Modris O. A. Baum, Eshwar Pittampalli, Roy H. Durdik and Edward F. Berliner entitled "Optimizing of Per Settings During Soft Handoffs", which application is assigned to the assignee of the present application and is being filed concurrently herewith.

TECHNICAL FIELD

This invention relates to wireless telecommunications networks, and more particularly, to enhancing the compatibility and performance of such networks during soft handoff procedures.

BACKGROUND OF THE INVENTION

The world-wide proliferation of wireless telecommunications technology presents an opportunity for service providers to profit from an ever-growing demand for convenient, reliable wireless service. As these service providers are well aware, controlling expenses while providing such service poses a significant challenge. Wireless service providers meet this challenge by implementing wireless telecommunications networks comprised of mobile switching centers (MSCs) interconnected to base stations. The MSC completes calls between mobile terminals (that is, any mobile station which uses radio transmission) and other parties. These "other parties" may be other mobile terminals or telephone subscribers served by the public-switched telephone network (PSTN). Each base station is associated with a specific geographic region and serves as an interface between mobile terminals within its region and the MSC.

One consequence of the explosive use of wireless telecommunications and the emergence of numerous wireless service providers in the world market is the implementation of many, diverse wireless networks. The various systems and protocols deployed by these networks often yields equipment incompatibility affecting overall network performance. An especially troubling manifestation of this incompatibility is the inability of existing wireless networks to reconcile incongruent forward link gains (that is, the power supplied by the base station to active mobile terminals) when more than one base station is involved in supporting a call.

Multiple base stations are involved in a call during "soft handoff" procedures which routinely occur in code division multiple access (CDMA) wireless telecommunications networks. In a soft handoff situation, each base station handles a certain "leg" of the call. Although multiple base stations serve various legs of the call, there is generally one base station (i.e., the dominant base station) which maintains a more powerful forward link with the mobile terminal than any other base station. Since disparity among the legs of a call is undesirable, unequal forward link power levels may lead to an attempt, on the part of the nondominant base stations, to increase forward link gains in order to compensate for insufficient gain from a dominant base station. Even if the nondominant base stations are successful in increasing forward link gains to match that of the dominant base station, the increase may not significantly enhance the transmission quality of the call. Indeed, unilateral increases in forward link gains by nondominant base stations adversely affect other active mobile terminals being served by those base stations. In other words, increasing forward link power levels by base stations which are not providing the strongest signal to an active mobile terminal in order to match forward link power levels of dominant base stations causes detriment to other calls served by those base stations and provides marginal benefits to the call in question.

Therefore, there is a need in the art for reconciling forward link power levels among base stations in a wireless telecommunications network.

SUMMARY OF THE INVENTION

This need is addressed and a technological advance is achieved by establishing communication between a centralized power control system, a selection/distribution unit (SDU) and participating base stations so that the SDU is notified of the applied forward link power gain setting and overload status. More particularly, when an overload status is attained by a base station, it informs the SDU of the actual value of the power gain level applied and its power overload status. Once the overload status is detected, no further gain increases by the SDU are allowed until the power overload condition is retracted. Gain decreases, however, are allowed. That is, the subsequent gain values can be less than or equal to the value returned with the most recent response indicating overload.

In the preferred embodiment, a MSC includes a SDU equipped with a central power control system. Multiple base stations participating in a soft handoff provide the SDU with actual forward link power gain settings and, if applicable, overload status. This information is transmitted over an SDU/base station communication protocol described in the patent application of Michael F. Dolan, Thomas L. McRoberts, Eshwar Pittampalli and Thomas T. Towle entitled "Wireless Telecommnunications System For Improving Performance And Compatibility", Ser. No. 08/881192, and incorporated by reference herein. Applied forward link gain and overload status information is received and stored in the SDU power control system which monitors and determines all forward link power levels associated with other base stations participating in active calls. When an overload status alert message is received, the SDU is prohibited from increasing forward link gains until the power overload condition is retracted. Simultaneously, the SDU requests all soft handoff participating legs to adjust their respective forward link gain settings to match that of the overloaded leg.

DETAILED DESCRIPTION

Figure 1A:
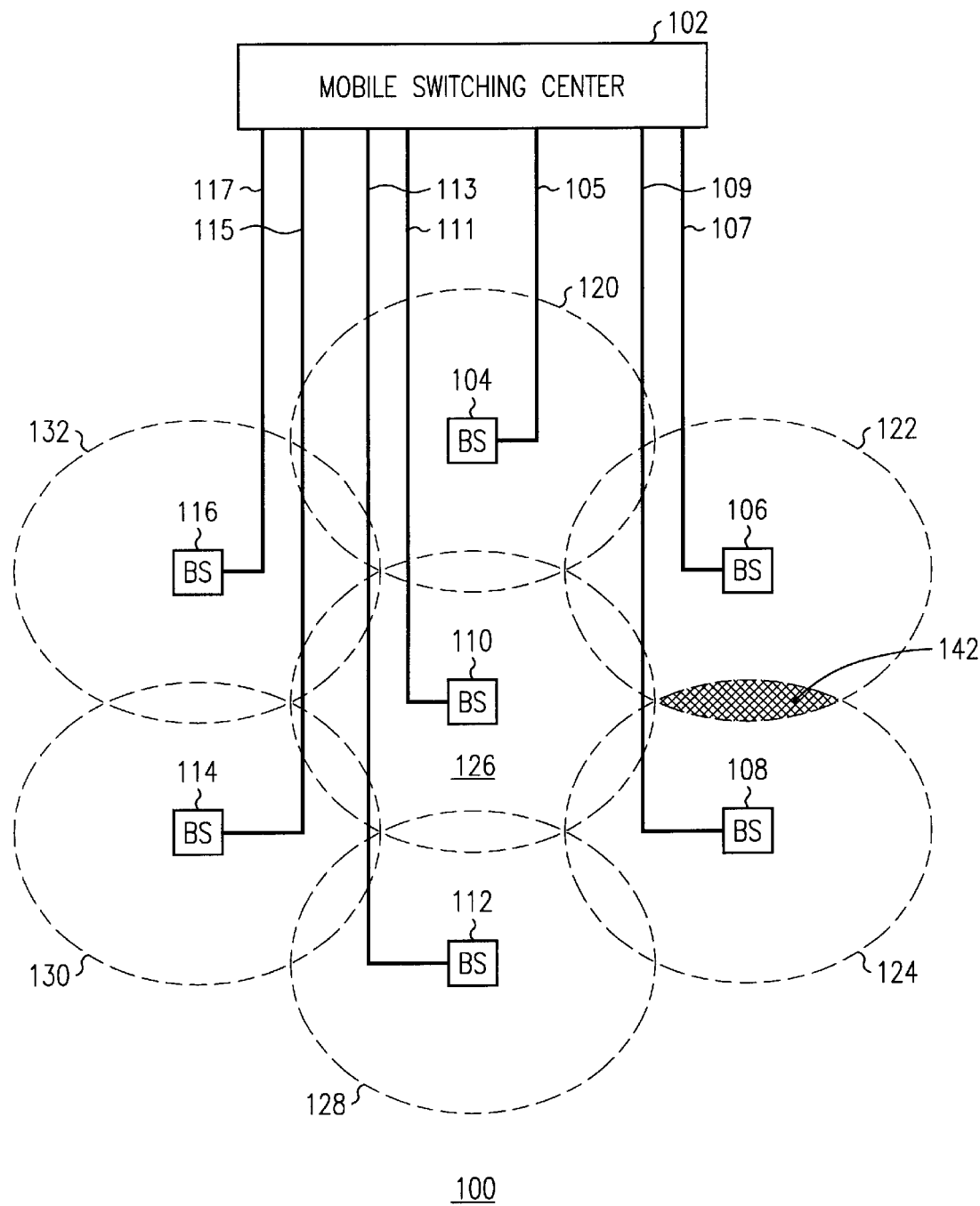
FIG. 1A is an illustrative embodiment of a wireless telecommunications system in which the present invention may be practiced.

FIG. 1A shows wireless telecommunications system 100 including mobile switching center (MSC) 102 and a plurality of base stations interconnected to the mobile switching center. More particularly, base stations 104, 106, 108, 110, 112, 114 and 116 are interconnected to MSC 102 via interconnection trunks 105, 107, 109, 111, 113, 115 and 117, respectively. Each interconnection trunk 105, 107 . . . 117 includes three separate communication links between each base station and MSC 102. These links are described in detail in FIG. 1B. Wireless telecommunications system 100 is a CDMA system in which multiple base stations may serve various legs of a call. In this regard, MSC 102 allocates and monitors base station resources to properly administer information exchange during a mobile call.

In wireless telecommunications system 100, each base station is associated with a particular geographic region in which it is assumed that it will serve as the dominant base station for mobile calls in that region. More particularly, base station 104 is the dominant base station associated with geographic region 120, base station 106 is the dominant base station for geographic region 122, base station 108 dominates geographic region 124, base station 110 is the dominant base station for geographic region 126, base station 112 is the dominant base station associated with geographic region 128, base station 114 is associated with geographic region 130, and base station 116 is the dominant base station associated with geographic region 132. Also shown in FIG. 1A are locations where geographic regions of base stations overlap. One overlap location is identified as intersecting region 142. In intersecting region 142, mobile terminal 150 may be served by multiple base stations (most likely base station 106 and base station 108). Although multiple base stations may serve a mobile terminal, there is normally one base station which maintains a stronger forward link with the mobile terminal during a call.

MSC 102 determines the allocation of base station resources for a particular mobile terminal. Accordingly, when an active mobile terminal is in an overlap geographic region, MSC 102 administers a soft handoff among base stations. Soft handoff occurs when the power level of the signal between the mobile terminal and another base station is increased above a predetermined threshold. Soft handoff resource allocation procedures must account for the different operating parameters of each base station involved. One such operating parameter is the power gain applied to the forward link by the base stations.

Figure 1B:
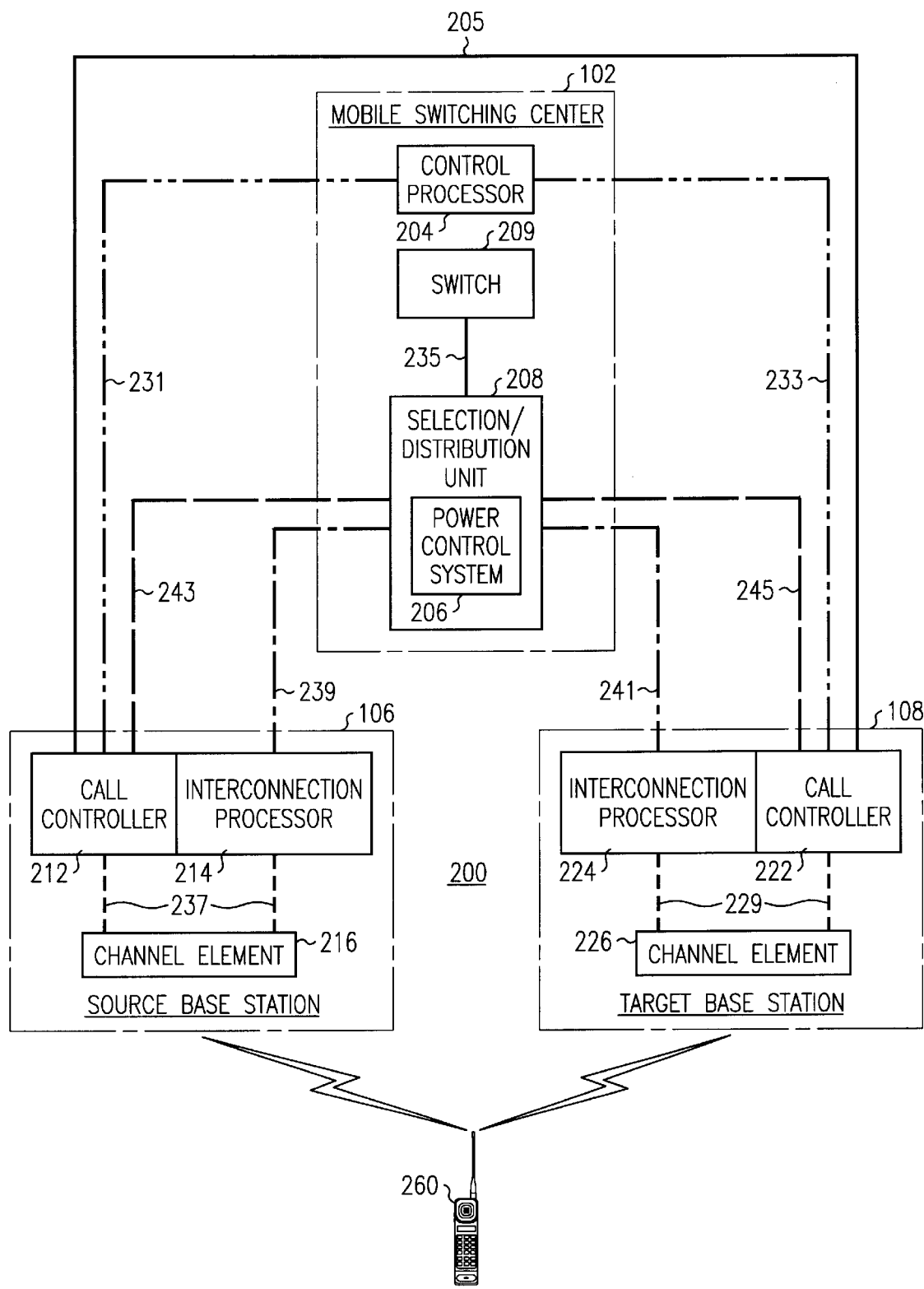
FIG. 1B is a simplified block diagram depicting the mobile switching center and two base stations shown in FIG. 1A.

FIG. 1B is a simplified block diagram of MSC 102 and base stations 106 and 108. The system architecture shown in FIG. 1B is described in more detail in the patent application of Michael F. Dolan et al. entitled "Wireless Telecommunications System for Improving Performance and Reliability", Ser. No. 08/881,192, which is incorporated by reference herein.

In this embodiment, MSC 102 comprises control processor 204, switch fabric 209 and SDU 208 including power control system 206. Switch fabric 209 is interconnected to SDU 208 via link 235.

Base station 106 includes call controller 212, interconnection processor 214 and channel element 216. Channel element 216 is interconnected to the call controller and interconnection processor via links 237. Also shown is base station 108 including interconnection processor 224 and call controller 222 which are interconnected to channel element 226 via links 229. In this embodiment, mobile station 260 is being simultaneously served by base station 106 and 108.

Base stations 106 and 108 maintain established interconnection links to MSC 102. More particularly, SDU 208 (including power control system 206) is interconnected to call controller 212 and interconnection processor 214 of base station 106 via interconnection links 243 and 239, respectively. MSC control processor 204 is interconnected to call controller 212 of base station 106 via interconnection link 231. Similarly, SDU 208 is interconnected to call controller 222 and interconnection processor 224 of base station 108 via interconnection links 245 and 241, respectively. Control processor 204 is interconnected to call controller 222 of base station 108 via interconnection link 233. In other words, each base station maintains three separate interconnection links to MSC 102. Together, the three links between each base station and MSC 102 form interconnection trunks 105,107 . . . 117 described in FIG. 1A. Further, call controller 212 of base station 106 and call controller 222 of base station 108 are interconnected via link 205.

Power control system 206 is responsible for monitoring forward link gains of all base stations in wireless telecommunications system 100. More particularly, power control system 206 receives forward link gain data from base station interconnection processors 214 and 224. During a soft handoff procedure, a base station sends a handoff required request to MSC 102 so that the MSC may allocate resources to another base station for a call. If a forward link gain overload message is received in power control system 206 from a base station during soft handoff, the power control system determines a forward link gain acceptable to all base stations involved in the call. Further, power control system 206 accommodates a base station's inability to increase forward link gains until the overload situation has been retracted by the base station.

Figure 2A:
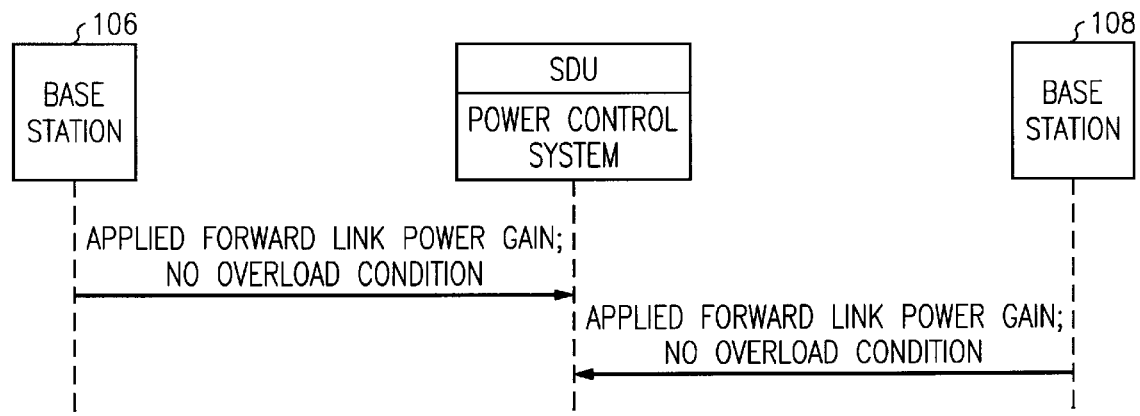
FIGS. 2A and 2B are message flow diagrams illustrating the exchange of messages in the wireless telecommunications system of FIGS. 1A & 1B in accordance with the preferred embodiment of the present invention.
Figure 2B:
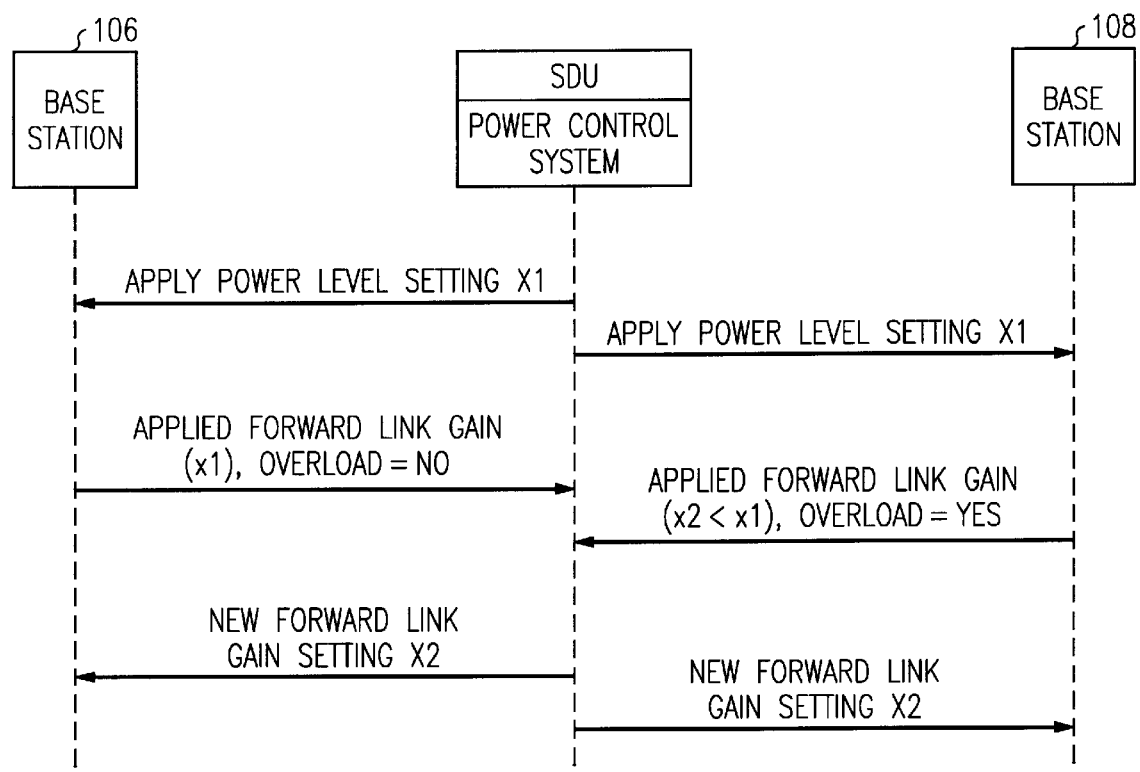

FIGS. 2A and 2B are message flow diagrams illustrating the exchange of messages in wireless telecommunications system 100 during a soft handoff procedure in accordance with the preferred embodiment of the present invention.

For purposes of example, assume that mobile terminal 260 is located in intersecting region 142 where it is being simultaneously served by base stations 106 and 108 during a soft handoff. In alternative embodiments, more than two base stations may serve a mobile terminal in an intersecting region and soft handoffs may occur among base stations served by different MSCs. The soft handoff procedure begins when base station 106 extends a handoff request message to MSC 102. MSC 102 receives the handoff request message and determines which base station is most capable of handling the call. In this example, MSC 102 determines that base station 108 is the base station to be added for a soft handoff with base station 106 to support the active call.

FIG. 2A is a message flow diagram in a soft handoff state depicting the messaging required to inform the power control system of the actual forward link power gain applied at base stations having radio facilities used in a call. For purposes of example, assume that the messages described below are exchanged within wireless telecommunications system 100 as shown in FIG. 1. In this example, power control system 106 receives a message from each base station involved in the soft handoff. These messages contain information about the actual forward link gain applied to the call from base stations 106 and 108. In this example, neither base station is in overload condition.

FIG. 2B is a soft handoff message flow diagram depicting the messaging required to inform the power control system of the actual forward link power gain applied at base stations having radio facilities used in a call in which at least one of those base stations is experiencing an overload or an equipment limitation condition. For the purposes of example, assume that the messages described below are exchanged within wireless telecommunications system 100 as shown in FIG. 1.

In the preferred embodiment, power control system 206 extends a message to each base station requesting the forward link power gain setting to be established at a level "X1". Subsequently, power control system 206 receives a message including information about the actual forward link gain applied to the call from base station 106. Base station 106 indicates the applied forward link gain is "X1" and no overload situation exists. Base station 108, however, suggests applying a forward link gain at level "X2" which is less than "X1". Also base station 108 indicates it is in an overload condition. Power control system 206 receives the forward link data and determines an appropriate forward link gain. In this example, power control system 206 can change power gain settings in all legs but cannot exceed "X2" on any leg. Accordingly, power control system 206 establishes the forward link gain setting at level "X2" for base stations 106 and 108. This power level is not increased until base station 108 comes out of its "overload" condition by extending a "no overload" message to the SDU. In alternative embodiments, power control system 206 may extend a default forward link gain to all participating base stations whenever an overload condition exists.

In this manner, communication of power level limits of a base station to a power control system is established. As a result, base stations are circumvented from increasing power to the forward link and thereby unnecessarily causing system performance degradation. More particularly, the SDU in an MSC coordinating a soft handoff procedure determines a forward link gain which is acceptable to all base stations involved in the process. Advantageously, unnecessary increases in powered levels to the forward link are avoided so that base stations in a wireless telecommunications network may efficiently use resources.

Although the present invention has been described with respect to an illustrative embodiment, those skilled in the art will recognize that numerous other arrangements may be devised without departing from the scope of the invention.

What is claimed is:

1. A method of establishing a forward link gain for base stations during a call handoff procedure, comprising:

receiving a forward link gain from each base station involved in the soft handoff procedure for a given call;

receiving an indication from at least one of the base stations that the at least one base station is in an overload condition; and instructing each base station, involved in the soft handoff procedure for the given call, having a received forward link gain greater than the received forward link gain of the overloaded base station to apply a forward link gain equal to or less than the received forward link gain of the overloaded base station.

2. The method of claim 1, wherein the receiving a forward link gain step receives a suggested forward link gain from the overloaded base station and receives actual forward link gains from the other base stations.

3. A wireless telecommunications system, comprising:

a controller receiving a forward link gain from each base station involved in a soft handoff procedure for a given call, the controller receiving an indication from at least one of the base stations that the at least one base station is in an overload condition, and instructing each base station involved in the soft handoff procedure for the given call, having a received forward link gain greater than the received forward link gain of the overloaded base station to apply a forward link gain equal to or less than the received forward link gain of the overloaded base station.

4. The method of claim 3, wherein the controller receives a suggested forward link gain from the overloaded base station and receives actual forward link gains from the other base stations.

* * * * *